Jan. 28, 1969 KARL-FRIEDRICH LEISINGER ET AL 3,424,924

SWITCHING SYSTEM FOR SUCCESSIVE IGNITION OF FIRING DEVICES AT DELAYED INTERVALS

Filed Nov. 8, 1967

INVENTORS

Karl-Friedrich Leisinger

Christian Rüdiger

BY Krafft & Wells

ATTORNEYS

United States Patent Office 3,424,924
Patented Jan. 28, 1969

3,424,924

SWITCHING SYSTEM FOR SUCCESSIVE IGNITION OF FIRING DEVICES AT DELAYED INTERVALS

Karl-Friedrich Leisinger and Christian Rudiger, Haltern, Germany, assignors to Wasag-Chemie Aktiengesellschaft, Essen, Germany Filed Nov. 8, 1967, Ser. No. 681,322
Claims priority, application Germany, Nov. 12, 1966, W 42,788
U.S. Cl. 307—252 6 Claims
Int. Cl. H03k *17/60*

ABSTRACT OF THE DISCLOSURE

A switching system comprising transistors and four layer diodes in intermittent switches for successively firing explosives and propellants by a plurality of igniters at delayed intervals. The system has a first transistor $T_1$ which has a control electrode switched by a positive impulse. This first transistor is connected to the desired number of identical ignition circuits in the same manner with each individual igniter connected in series with a resistor $R_4$, $R_7$ . . . and in parallel with a resistor $R_3$, $R_6$ . . . in a cathode circuit of the respective transistor $T_1$, $T_2$ . . . . The anode of each transistor is connected to the positive bus of a D.C. voltage source. The cathode of each transistor has a potentiometer $P_1$ and/or a resistor branching out from it in the same manner and in series therewith a capacitor is connected to a negative bus of a D.C. potential. On the anode side of the capacitor a four layer diode is connected through a resistor $R_5$ to the negative bus of the D.C. source. The four layer diode also connects the control electrode of the next transistor through a coupling capacitor $C_3$ . . . with the coupling capacitor located behind the resistor $R_5$.

CROSS REFERENCE TO A RELATED APPLICATION

Applicants claim priority under 35 U.S.C. 119 for application Ser. No. W 42,778, filed Nov. 12, 1966, in Germany.

BACKGROUND OF THE INVENTION

The field of the invention includes switching systems having a make or break at a predetermined time in the cycle and electric timer controlled igniting devices.

The state of the prior art switching systems having a make or break at predetermined times in the cycle is shown by the U.S. patents of Kiltz, No. 2,988,672 issued June 13, 1961; Krestel et al. No. 3,122,659, issued Feb. 25, 1964 and Haver et al. No. 3,286,135, issued Nov. 15, 1966.

The patent of Kiltz discloses a switching apparatus for opening and closing a circuit for supplying alternating current to a load at a desired time relative to the phase of the alternating wave.

According to Krestel et al. a semi-conductor switching device comprising a four way diode is connected with a disconnect contactor of a mechanical type and the control circuit of the contactor is interconnected with the switching device by an interlocking circuit which controls the disconnect contactor to be actuated only when the switching device is in blocking condition. The circuit diagrams shown in the figures of the Krestel et al. patent illustrate switching devices for disconnecting a load from a direct current supply comprising a loan circuit, a semi-conductor controllable device of the four layer type, a contactor having contact and control coil means for causing said contacts to open, a firing circuit, an extinguishing circuit and circuit means connecting the control coil means across the load circuit.

Haver et al. disclose electrical timing circuits for the precise timing of a single preselected interval. The device is designed to cooperate, if desired, with several other similar units and the device is particularly adaptable for use as a plug-in module or drawer unit in a machine which may include several such modules. The timer comprises a first valve, a direct current source for supplying a positive D.C. potential to the anode member of the first valve, means supplying voltage in phase with the source voltage to the control member of the first valve, and means connecting the cathode member of the first valve to the other side of the direct current source.

There exists a need for devices which will set off successive ignitions at predetermined delayed intervals for both military and domestic use. As examples of these utilities, the following are mentioned:

(1) The so-called smoke screen throwers which comprise rockets that are fired successively at intervals of about 0.5 second; and (2) The carrying out of seismic explorations by the blasting of rock formations with delayed ignition of explosives in successive boreholes.

According to the prior art smoke screen throwers, the rockets are actuated by a mechanical switching device having a plurality of electric contacts for successively connecting the voltage source to a plurality of circuits leading to a series of firing devices. The distance between two successive switching positions is traversed by a spring actuated electric contact arm and the distance between the successive switching positions corresponds to the time delay between successive firings.

In order to carry out the prior art ignition of explosives in successive boreholes, an igniter is provided having a combustible delaying element.

SUMMARY OF THE INVENTION

Having in mind the limitations of the prior art, it is an object of the present invention to provide a switching system having a time delay circuit without mechanically actuated contacts.

A particular object of the present invention is to provide a switching system using an electronic circuit for successive timed firings.

Another object of the present invention is to provide for a standard module which may be replicated any number of times depending on the series of firings to be made.

Upon further study of the specification, drawings and claims, other objects and advantages of the present invention will become apparent.

The intermittent switch of the present invention causes successive ignition by using an electronic circuit that does not contain electro-mechanical contacts. It is characterized by a first transistor $T_1$ whose control electrode is switched by a positive impulse. The transistor is connected in the same manner to a suitable number of ignition circuits. Each igniter of the ignition circuits is connected on one side to the cathode circuit of its transistor ($T_1$, $T_2$ . . .) whose anode is connected to a source of positive voltage. On the other side the igniter is connected in series with a resistor ($R_4$, $R_7$ . . .) and in parallel with a resistor ($R_3$, $R_6$ . . .) to a source of negative potential. A potentiometer ($P_1$ . . .) and/or a resistor branch out in the same manner from the cathode of each transistor and behind this a capacitor is connected to the source of negative potential. On the anode side of this capacitor a four layer diode is connected first through a resistor to the source of negative potential and second to a coupling capacitor ($C_3$ . . .) to the control electrode of the next following transistor.

The portion of the circuit to the right of the vertical dotted line represents a module which may be repeated as many times as desired. The horizontal dotted lines represent the connections to subsequent modules.

Figure 1:
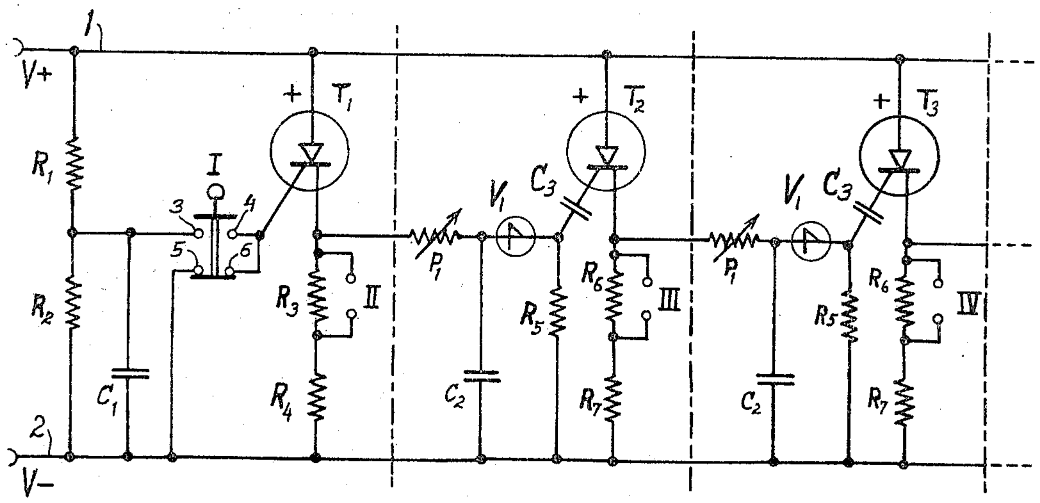
FIGURE 1 is a schematic diagram of a preferred circuit embodying the invention.

In FIGURE 1 resistors $R_1$ and $R_2$ are connected between busses 1 and 2 of a D.C. line having an applied voltage V. A first position of the switch I engages contacts 3 and 4 and connects the line between $R_1$ and $R_2$ to the control electrode of transistor $T_1$. A capacitor $C_1$ is connected to contactor 3 in parallel with resistor $R_2$. The anode side of transistor $T_1$ is connected to bus 1 and the cathode side is connected first to the module or portion of the circuit that is repeated and second to bus 2 through resistors $R_3$ and $R_4$ wherein $R_3$ is parallel with igniter clips II. A second position of switch I engages contacts 5 and 6 and connects the control electrode of $T_1$ to bus 2.

The repeated portion of the circuit connects the cathode of transistor $T_1$ in series with potentiometer $P_1$, four layer diode V, capacitor $C_3$ and the control electrode of transistor $T_2$ is connected between potentiometer $P_1$ and four layer diode $V_1$ to bus 2. Resistor $R_5$ is connected between four layer diode $V_1$ and capacitor $C_3$ to bus 2. The anode of transistor $T_2$ is connected to bus 1 and the cathode is connected to bus 2 through resistors $R_6$ and $R_7$ wherein igniter clips III are in parallel with resistor $R_6$.

Figure 2:
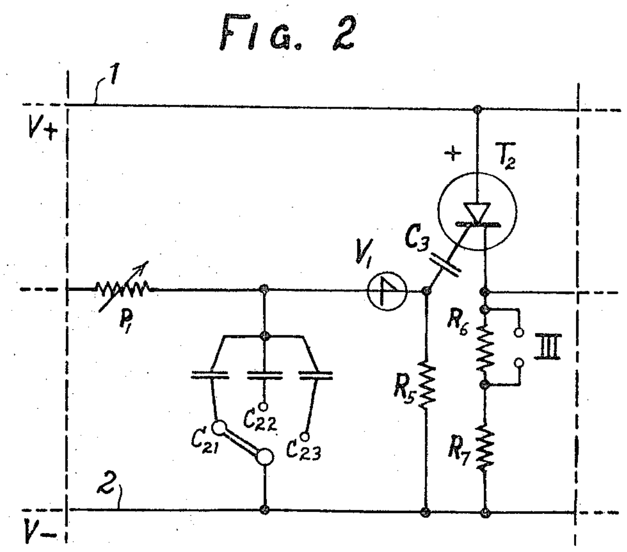
FIGURE 2 shows a modification in the replicated portion of the circuit of FIGURE 1.

FIGURE 2 has selective capacitors $C_{21}$, $C_{22}$ and $C_{23}$ in place of capacitor $C_2$ of FIGURE 1.

DESCRIPTION OF THE PREFERRED EMBODIMENTS

According to the circuits of FIGURE 1 and 2 the resistors $R_1$ and $R_2$ form a voltage divider which keeps the capacitor $C_1$ under a voltage which is sufficient to energize the first transistor $T_1$, but without overloading it. By pressing down upon the switch I, or by the use of a circuit closing key, and with the capacitor $C_1$ charged, the first transistor $T_1$ is switched and rendered conducting. Before the switching, the transistor has a practically infinite resistance, but after switching its resistance becomes negligible.

The first transistor $T_1$ is also controllable by a positive impulse which is given to it electronically by any known means.

The current through the igniter, after switching of its respective transistor, is determined by the resistance of the igniter which is inserted between the clips II and the resistor $R_4$. The resistor $R_4$ limits the current so that even if after elimination of the first igniter between the clips II the ignition wires form a short circuit, the transistor $T_1$ is not overloaded. Depending on the input of the intermittent switching device, the resistor $R_4$ can be kept larger or smaller, because the electric resistance of the ignition circuits depends thereon. If the ignition circuits are very long and the resulting resistance thereof is high, then the resistor $R_4$ is representative of the resistance in the ignition circuits or has a zero value.

The resistor $R_3$ has such a value that a current is maintained through transistor $T_1$ after it is once switched through, and the ignition wires after firing of the first igniter have formed an open circuit between clips II. $R_3$ is much greater than the resistance of the igniter with its connecting wires.

After the transistor $T_1$ has been rendered conducting, the capacitor $C_2$ becomes charged by the potentiometer $P_1$ and transistor $T_1$ up to the voltage at which the four layer diode $V_1$ becomes conducting.

The four layer diode $V_1$ is chosen so that its switching voltage is smaller than the feed voltage $V_1$ across busses 1 and 2 of the D.C. line.

The time constant $P_1C_2$ determines approximately the delay time between the firings of the first and second igniters II and III. This can be made continuous through potentiometer $P_1$ as shown in FIGURE 1, or discontinuous by reswitching the capacitors $C_{21}$, $C_{22}$, $C_{23}$, as shown in FIGURE 2.

After the capacitor $C_2$ has been charged to the switching voltage of the four layer diode $V_1$, the latter becomes conducting and gives at resistor $R_5$ and across $C_3$ an impulse to the control electrode of transistor $T_2$. In the cathode circuit of transistor $T_2$, as in the circuit of transistor $T_1$, the second igniter III and the resistors $R_6$ and $R_7$ function in the same manner as resistors $R_3$ and $R_4$.

The switching elements are now repeated from step to step any number of times. Behind the broken lines in FIGURE 1 and FIGURE 2, the same circuit elements are repeated each time in the same manner from transistor to transistor.

All transistors in these figures are shown connected to the same voltage sources, but that is not necessary. In a particular embodiment, each transistor has its own voltage source, which consists of charged capacitors. It is also possible for the common voltage source to consist of a battery of charged capacitors.

The present intermittent switching device eliminates the necessity of mechanical switching contacts in the ignition circuits. In contrast to a mechanical switching device, it has the advantage of permitting the delay from step to step to be adjusted at will. In its application to domestic uses it eliminates the necessity of using igniters having different timing periods. In each boring the same kind of igniter can now be used.

It will be understood that this invention is susceptible to modification in order to adapt it to different usages and conditions and, accordingly, it is desired to comprehend such modifications within this invention as may fall within the scope of the appended claims.

We claim:

1. A switching system comprising:

(A) a direct current supply with positive and negative contacts;

(B) a first transistor having an anode connected to said positive contact, a cathode and a control electrode that is switched by a positive impulse;

(C) a first resistor and a second resistor connected in series with the cathode of said first transistor and said negative contact;

(D) first igniter clips connected in parallel with said first resistor; and (E) a repeatable circuit connected in series with the cathode of said first transistor, said circuit comprising:

(a) a potentiometer or a third resistor connected in series with the cathode of said first transistor;

(b) a four layer diode connected in series with said potentiometer or third resistor;

(c) a first capacitor connected in series with said four layer diode;

(d) a second transistor having an anode connected to said positive contact, a control electrode connected in series with said first capacitor and a cathode;

(e) a second capacitor connected between said potentiometer or third resistor to said negative contact;

(f) a fourth resistor connected between said four layer diode and said first capacitor to said negative contact;

(g) a fifth and a sixth resistor connected in series with the cathode of said second transistor and said negative contact; and (h) second igniter clips connected in parallel with said fifth resistor.

2. The switching system of claim 1, further comprising a seventh resistor in series with said potentiometer.

3. The switching system of claim 1, wherein said second capacitor is a multiple range capacitor switching device.

4. The switching system of claim 1, wherein the positive impulse of the control electrode of said first transistor comprises a plurality of charged capacitors.

5. The switching system of claim 1, further comprising a plurality of said repeatable circuits.

6. The switching device of claim 5, wherein each of said transistors has its own source of electric potential.

References Cited

UNITED STATES PATENTS

| | | | |
|---|---|---|---|
| 3,133,231 | 5/1964 | Fail et al. | 317—80 |
| 3,255,366 | 6/1966 | McNulty et al. | 307—106 |
| 3,311,788 | 3/1967 | Faige | 317—80 |
| 3,312,869 | 4/1967 | Werner | 307—252 X |

VOLODYMYR Y. MAYEWSKY, *Primary Examiner.*

U.S. Cl. X.R.

102—70.2; 315—230; 317—80; 320—1